Oct. 15, 1957    M. P. WINTHER    2,809,534
AUTOMATIC TRANSMISSION

Filed June 3, 1954    4 Sheets-Sheet 3

INVENTOR.
MARTIN P. WINTHER
BY Hudson, Boughton,
Williams, David & Hoffmann
ATTORNEYS

United States Patent Office

2,809,534
Patented Oct. 15, 1957

2,809,534

AUTOMATIC TRANSMISSION

Martin P. Winther, Gates Mills, Ohio, assignor to Eaton Manufacturing Company, Cleveland, Ohio, a corporation of Ohio Application June 3, 1954, Serial No. 434,128

15 Claims. (Cl. 74—472)

This invention relates to automatic transmissions for motor vehicles, and as one of its objects, aims to provide an automatic transmission which is of a relatively simple and economical construction but which will perform with a smooth and satisfactory action under all conditions of operation.

Another object is to provide an automatic transmission employing a plurality of electromagnetic clutches in combination with a gear mechanism affording a plurality of different transmission ratios, and in which the shifting of the gear mechanism and the selective energization of the clutches are controlled automatically.

A further object is to provide an automatic transmission in which two such electromagnetic clutches, located on the input side of a gear mechanism having a power actuated shift means responsive to intake suction, are selectively energized by the combined action of speed responsive and intake suction responsive switch means such that automatic shifting up or down from one to another of the conventional three transmission ratios will be smoothly accomplished.

Still another object is to provide an automatic transmission of the character above indicated in which the energization of the magnetic clutches and the actuation of the shift means are also dependent upon the manual actuation of the intake throttle by the accelerator such that the second gear ratio will automatically come into operation when needed for certain situations, such as for hill climbing or for passing other vehicles, and in which a shift from high gear to second gear, or directly to low gear, will occur automatically and whenever needed for smooth operation.

Yet another object is to provide such an automatic transmission in which the voltage of the clutch energizing current is automatically controlled so as to obtain a smooth and gradual clutching action, particularly during starting in low gear setting.

Additionally, this invention provides an automatic transmission which will permit a dead engine to be driven either through the high gear ratio or through the second gear ratio for starting purposes by pushing or pulling of the vehicle.

The invention can be further briefly summarized as consisting in certain novel combinations and arrangements of parts hereinafter described and particularly set out in the claims hereof.

In the accompanying sheets of drawings forming a part of this specification:

Figure 1:
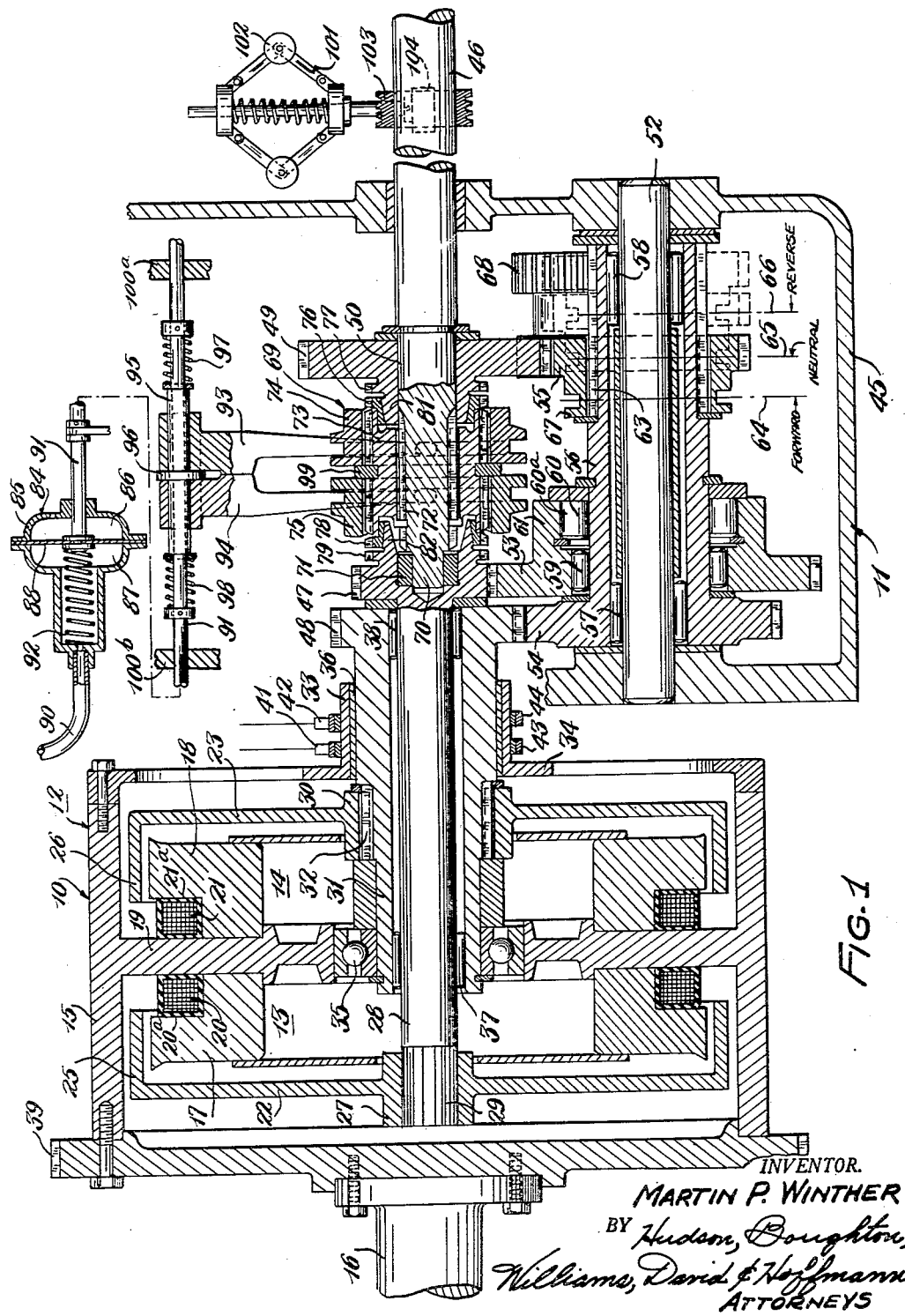
Fig. 1 is a vertical axial section taken through an automatic transmission embodying the present invention.

In proceeding with a more detailed description of the invention, reference will first be made to Fig. 1 of the drawings showing clutch and gear units 10 and 11 of the automatic transmission 12.

The clutch unit 10 comprises a pair of electromagnetic clutches 13 and 14 located in a rotatable clutch housing 15 which is connected with an input shaft 16 such as the power delivery shaft of an internal combustion engine or the like. The magnetic clutches 13 and 14 comprise rotatable annular field member 17 and 18 carried by the internal radial annular wall 19 of the clutch housing 15 and annular energizing windings 20 and 21 located in coil receiving annular recesses 20a and 21a defined between the internal wall 19 and the field members 17 and 18.

The magnetic clutches 13 and 14 also comprise rotors 22 and 23 associated with the field members 17 and 18. The rotor 22 has an axially extending annular rim portion 25 disposed between the field member 17 and the outer wall of the clutch housing 15 so as to lie in the magnetic circuit of the clutch 13. Similarly, the clutch rotor 23 has an axially extending annular rim portion 26 located between the field member 18 and the outer wall of the housing 15 so as to lie in the magnetic circuit of the clutch 14.

The rotor 22 of the magnetic clutch 13 includes a central hub 27 by which this rotor is mounted on a shaft member 28 and secured thereto by means of the spline connection 29. The rotor 23 of the clutch 14 is provided with a central hub 30 by which this clutch rotor is mounted on a hollow shaft member 31 and secured thereto by means of the spline connection 32. The shaft member 28 extends coaxially through the hollow shaft member 31 and both of these shaft members project rearwardly from the clutch housing 15 through the central bearing sleeve 33 of the rear wall 34.

The hollow shaft member 31 is here shown as being rotatably mounted in the clutch housing 15 by means of an anti-friction bearing 35 located in a central opening of the internal radial wall 19 and a bushing 36 located in the rearwardly projecting bearing sleeve 33. The inner shaft member 28 is rotatably supported in the hollow shaft member 31 by suitable anti-friction bearing means 37 and 38. As here shown, the clutch housing 15 can be provided with flywheel teeth 39 for engagement by the drive pinion of a starting motor.

Energizing current for the windings 20 and 21 of the magnetic clutches 13 and 14 can be supplied thereto through suitable brushes 41 and 42 cooperating with slip rings 43 and 44 mounted on the bearing sleeve 33 in insulated relation thereto.

The gear unit 11 comprises a housing 45 having change speed gearing contained therein, and also includes an output shaft 46 projecting from such housing in coaxial alignment with the shaft member 28 for connection with the driving axle and traction wheels of the vehicle. The change speed gearing of the unit 11 also comprises gears 47 and 48 formed on or secured to the rear ends of the shaft members 28 and 31 respectively. The gear members 47 and 48 and their drive shafts 28 and 31 constitute the power input members for the gear unit 11. The gearing of the unit 11 further includes a gear 49 rotatably mounted on a journal portion 50 of the output shaft 46.

The gear unit 11 also comprises a countershaft 52 mounted in the housing 45 in offset relation to the axis of the output shaft 46 and a plurality of gear members 53, 54, and 55 rotatably supported by such countershaft. The gears 53 and 54 are in meshed engagement with the gears 47 and 48 such that the pair of cooperating gears 47 and 53 provide a low gear ratio of suitable value for the unit 11 and the pair of cooperating gears 48 and 54 provide an intermediate or second gear ratio of suitable value.

The gear 54 is formed on or secured to a sleeve 56 which is rotatably mounted on the shaft 52 by suitable anti-friction bearings 57 and 58. The gear 53 is rotatably mounted on the sleeve 56 by an anti-friction bearing 59 and is adapted to be drivingly connected with this sleeve by a one-way clutch 60. The clutch 60 comprises an annular group of clutch rollers 60a located between the sleeve 56 and annular outer race or clutch ring 61 carried by the gear 53.

The gear 55 is connected with the sleeve 56 by a spline connection 63 and is axially shiftable to different settings represented by the forward, neutral, and reverse positions 64, 65 and 66 indicated in Fig. 1 of the drawings. The gear 55 is provided with a grooved shift collar 67 and is axially shiftable by suitable manually operable shift means (not shown) including a shifter fork engaging such shift collar.

The gearing of the unit 11 also includes a conventional reverse idler 68 suitably mounted in the housing 45 adjacent the gear 49. When the collar 67 is shifted to the forward position 64, the gear 55 will be in mesh with the gear 49 for the forward direction of operation of the transmission 12, and when the collar 67 is in the reverse setting 66, the gear 55 will be in mesh with the reverse idler 68. When the collar 67 is in the neutral or intermediate setting 65, the gear 55 will be in an intermediate position in which it is disengaged from both of the gears 49 and 68.

The gear unit 11 further includes a coupling device 69 by which the output shaft 46 can be selectively connected with either the gear 47 of the through shaft 28 or the gear 49. This coupling device 69 will be described next.

The forward end of the output shaft 46 is provided with a reduced portion 70 suitably journalled in a bushing 71 seated in a recess of the gear 47. At a point between the journal portion 50 and the extension 70, the output shaft 46 is provided with a spline section 72. The coupling device 69 comprises gear-like positive clutch elements 73, 74, 75, 76, 77, 78 and 79 of which the clutch element 73 is a relatively wide element located between the gears 47 and 49 and is drivingly connected with the output shaft 46 by the spline connection 72. The clutch elements 74 and 75 are internally toothed clutch rings and are disposed around, and have meshing engagement with, the wide clutch element 73 and are axially slidable on the latter. The clutch elements 76 and 78 are blocking elements, and the clutch elements 77 and 79 are auxiliary clutch elements which are formed on or connected respectively with the gears 49 and 47.

The blocking element 76 is disposed around and frictionally seated on a cone-shaped clutch member 81, which is formed on or carried by the gear 49, and which projects axially forwardly beyond the auxiliary clutch element 77. Similarly, the blocking element 78 is disposed around and frictionally seated on a cone-shaped clutch member 82, which is formed on or carried by the gear 47 and projects axially rearwardly toward the clutch member 81 and beyond the auxiliary clutch element 79.

The clutch rings 74 and 75 and the wide clutch element 73 are components of a so-called split synchromesh device by which the output shaft 46 is adapted to be connected either with the gear 49 or with the gear 47 of the shaft member 28. Connection of the output shaft 46 with the gear member 49 is accomplished by movement of the clutch ring 74 into engagement with the blocking element 76 which, through a frictional braking action on the clutch member 81, causes the rotation of the gear 49 to be slowed down to a speed which is substantially in synchronism with that of the blocking element 76. Thereupon the clutch ring 74 will smoothly shift further into full engagement with the auxiliary clutch element 77, thereby establishing a driving connection from the gear 49 to the output shaft 46, through the clutch ring 74, the wide clutch element 73, and the spline connection 72.

Similar axial shifting of the clutch ring 75, first into engagement with the blocking element 78, and subsequently into engagement with the auxiliary clutch element 79, will establish a driving connection between the shaft member 28 and the output shaft 46. This drive connection is a direct drive or unit ratio connection extending through the clutch ring 75, the wide clutch element 73, and the spline connection 72.

For shifting the clutch rings 74 and 75, the automatic transmission 12 is provided with a suitable power device, which in this instance is an intake suction responsive differential pressure device 84. This shift device 84 comprises a housing 85 which is divided internally thereof into diaphragm chambers 86 and 87 by a transverse diaphragm 84a. The chamber 86 is vented to atmosphere, and the chamber 87 is connected with the intake 89 (see Fig. 2) of the vehicle engine by a conduit 90. The diaphragm 84a is connected with a piston rod 91 projecting from the housing 85 and is responsive to intake suction for imparting axial movement to such piston rod in opposition to the compression spring 92.

The actuating movement of the shift device 84 is applied to the clutch rings 74 and 75 through suitable shifter forks 93 and 94, which have limited relative sliding on a sleeve 95 which itself is slidably shiftable on the actuating rod 91. A collar 96 carried by the sleeve 95 engages and actuates the shifter fork 93 upon movement of the rod 91 toward the right in response to the expansive action of the spring 92. The shifter fork 94 is similarly engaged and actuated by the collar 96 by movement of the actuating rod 91 in the opposite direction in response to suction actuation of the diaphragm 88 in opposition to the spring 92.

Compression springs 97 and 98, preferably preloaded springs, disposed around the rod 91 and effective against the ends of the sleeve 95 are engaged by the shifter forks 93 and 94 after a predetermined or initial movement of these shifter forks by the collar 96. The rod 91 is slidable in suitable support portions 100a and 100b of the gear case 45. When the rod 91 is in its neutral position, the springs 97 and 98 will tend to return the shifter forks to the substantially central position shown in Fig. 1 and corresponding with a fully disengaged condition of the clutch device 69, in which the clutch rings 74 and 75 are in their retracted or disengaged position adjacent a central radial stop collar 99 provided on the wide clutch element 73.

From the construction of the clutch and gear units 10 and 11 as above described, it will be seen that when the gear 55 is in mesh with the gear 49 and the clutch ring 74 is in engagement with the auxiliary clutch element 77, the gearing of the unit 11 will be in its low gear setting. If the field winding 20 of the magnetic clutch 13 is now energized, the power input into the gear unit 11 from the shaft 16 will be through the shaft member 28 and the gear 47. At this time the gear 47 will drive the gear 55 through the gear 53, the one-way clutch 60, and the sleeve 56. The energization of the magnetic clutch 13 when the gear 49 is connected with the output shaft 46 through the clutch ring 74 will therefore provide the lowest available gear ratio of the unit.

Energization of the field winding 21 of the magnetic clutch 14 connects the hollow shaft member 31 with the engine shaft 16 such that the gear 48 drives the gear 55 through the gear 54 and the sleeve 56 directly while the gear 53 is ineffective by reason of the one-way clutch 60. Energization of the magnetic clutch 14 while the gear 49 is connected with the output shaft 46 through the clutch ring 74 and the auxiliary clutch element 77 will therefore connect the output shaft with the input shaft 16 through the intermediate or second gear ratio setting of the unit 11. When the clutch ring 75 is engaged with the auxiliary clutch element 79, the output shaft 46 is direct connected to the shaft member 28. If the field winding 20 of the magnetic clutch 13 is energized at this time, the output shaft 46 will be connected to the input shaft 16 in the high gear or direct drive gear ratio setting of the unit 11.

Figure 2:
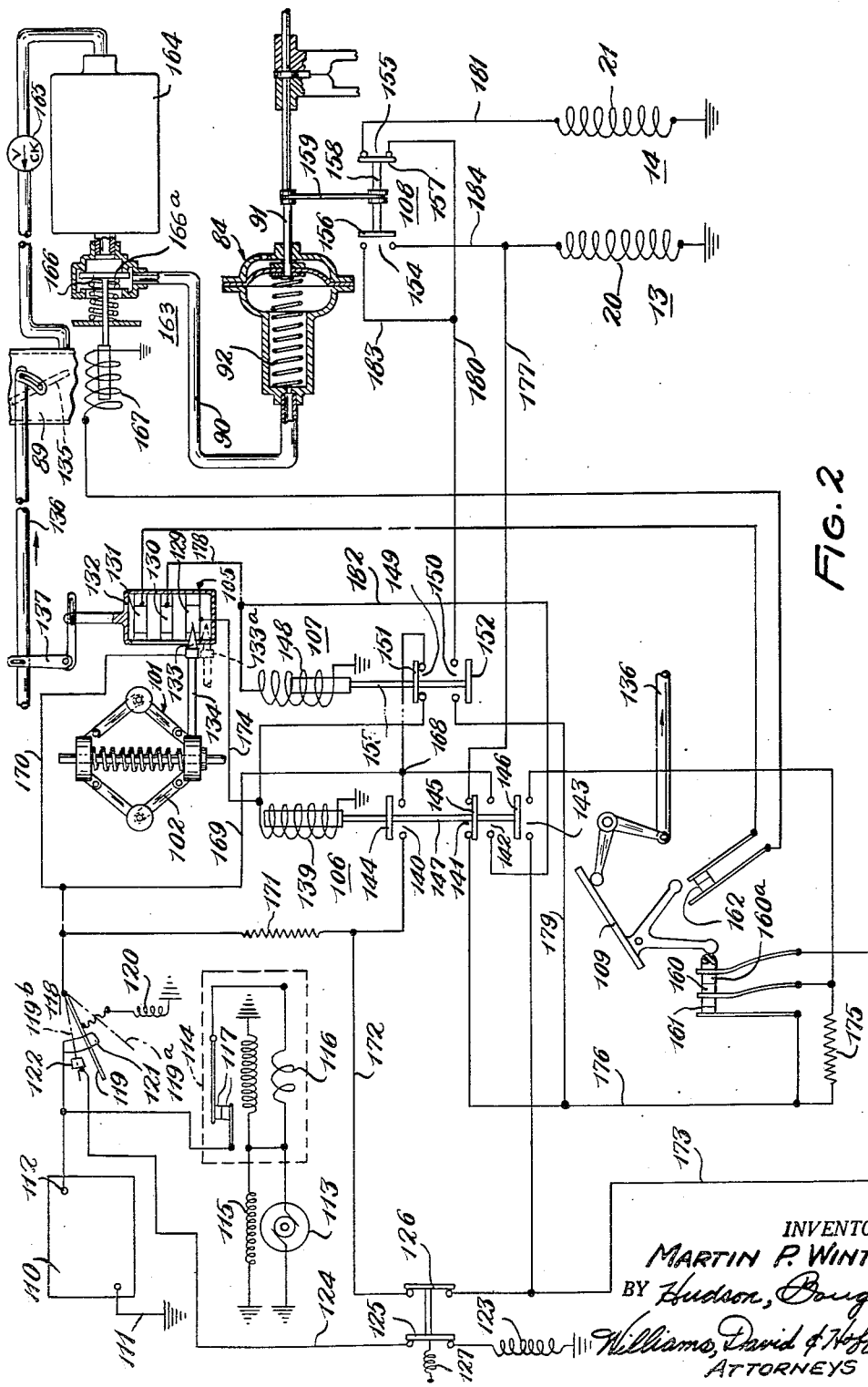
Fig. 2 is a diagrammatic view showing the control mechanism of the automatic transmission.

Fig. 2 of the drawings illustrates the control mechanism by which the automatic functioning of the transmission 12 is obtained and shows the control mechanism in low gear position. This control mechanism includes the above-described intake suction responsive power device 84, and also includes a speed responsive governor 101 which is here shown as comprising a flyball device 102 driven from the output shaft 46 through the gear members 103 and 104. The control mechanism also comprise a governor switch 105 forming a part of the speed responsive governor 101 and a pair of multiple contact electromagnetic switches 106 and 107. The control mechanism also includes a switch device 108 associated with the power device 84, and a group of switches associated with the accelerator pedal 109 and which will be further described hereinafter.

The electrical components of the control mechanism are embodied in circuits which will be described hereinafter and which are supplied with electric current from a storage battery 110, preferably the storage battery of the vehicle's electrical system. The battery 110 has one terminal thereof grounded, as indicated at 111, and has the other terminal 112 thereof connected with the generator 113 of the vehicle through a conventional reverse current cut-out 114. The generator 113 is here shown as being a shunt generator having a field winding 115 and is connected with the battery terminal 112 through the series coil 116 and the series contacts 117 of the reverse current cut-out 114.

Energizing current for the field windings 20 and 21 of the magnetic clutches 13 and 14, and for the other electrical components of the control mechanism, is supplied from the battery 110 through a switch device 118 which can be conveniently referred to as merely an ignition switch. The switch 118 comprises a movable switch member 119 having an open position 119a. The switch member 119 is connected with an ignition coil 120 for supplying energizing current to the latter when this movable switch member is in engagement with the contact 121, as represented by the full line showing.

The switch member 119 is movable to an engine starting position 119b in which it engages a contact 122 for supplying starting current to a starting relay 123 through a conductor 124 and a switch 125. The switch 125 is connected for actuation with a neutral switch 126 and both of the switches 125 and 126 are urged to a normally closed position by a spring 127 but are suitably held open when the manual shift lever for the gear 55 is in its neutral position.

The governor switch device 105 comprises a group of relatively stationary switch contacts 129, 130 and 131 which are supported by a contact carrier 132 on which they are mounted in insulated relation from each other and from such carrier. The governor switch device 105 also comprises a movable contact 133 mounted in insulated relation on an arm 134 of the flyball governor 102. The contact 133 has an initial or open position 133a from which it is movable by the flyball device 102 to successive closed positions in engagement with the contacts 129, 130 and 131. Since the flyball device 102 is driven by the output shaft 46, it is responsive to vehicle speed, and the movable contact 133 will therefore be moved into engagement with the contacts 129, 130 and 131 as the speed of the vehicle increases to values corresponding with these positions for such movable contact.

The intake 89 of the vehicle engine is provided with a conventional butterfly or throttle 135 for controlling the vehicle speed and is adapted to be opened varying amounts by actuating movement transmitted thereto through a push rod 136 in response to manual actuation of the accelerator pedal 109. The contact carrier 132 of the governor switch device 105 is movable relative to the contact 133 for advancing the action of this switch device in response to a sudden opening movement of the throttle 135 by the accelerator pedal 109. Such movement in the advancing direction is transmitted to the contact carrier 132 from the push rod 136 through the bell crank lever 137.

The electromagetic switch 106 comprises an actuating magnet 139 and a plurality of switches 140, 141, 142 and 143. This switch device also comprises movable switch members 144, 145, and 146 serving this group of switches and carried by a common actuating rod 147.

The switch 140 is a normally closed switch whose switch member 144 is in a closed position when the magnet 139 is deenergized. Likewise, the switches 142 and 143 are normally closed switches which are closed when the magnet 139 is deenergized. The switch member 145 is here shown as being common to the switches 141 and 142. When the actuating magnet 139 is energized, the normally closed switches 140, 142, and 143 are opened and the normally open switch 141 is closed.

The electromagnetic switch 107 comprises an actuating magnet 148 and a pair of switches 149 and 150. This switch device also comprises a pair of switch members 151 and 152 serving the switches 149 and 150 and carried by a movable actuating rod 153. The switch 149 is a normally closed switch whose contact member 151 is in a closed position when the magnet 148 is deenergized. The switch 150 is a normally open switch whose contact member 152 is moved to its closed position in response to energization of the magnet 148.

The switch device 108 comprises a pair of switches 154 and 155 which are associated respectively with the field windings 20 and 21 of the electromagnetic clutches 13 and 14. The switch device 108 also comprises movable switch members 156 and 157 serving the switches 154 and 155 and carried by a stem 158 which is substantially rigidly connected with the piston rod 91 of the power device 84 by an arm 159.

The switch 140 is a voltage control switch whose function and operation will be described hereinafter. The switch 149 is an energizing switch for the magnet 139 and the switch 142 is an energizing switch for the magnet 143. The switches 141, 142, 154, and 155 are clutch control switches which control the energization of the magnetic clutches 13 and 14 in the manner explained hereinafter.

A plurality of switches associated with the accelerator 109 comprises normally open accelerator switches 160 and 161 and a normally closed accelerator switch 162. The accelerator switches 160 and 161 assist in the control of the magnetic clutches 13 and 14 and the accelerator switch 162 controls the operation of the power device 84.

The conduit 90 of the intake suction responsive power device 84 is connected with the intake 89 through a solenoid valve device 163, a suction or low pressure storage tank 164, and a check valve 165. The valve member 166 of the solenoid valve device 163 is normally in a closed position disconnecting the power device 84 from the suction tank 164, but is adapted to be opened by the magnet 167 when the power device 84 is to be actuated by intake suction.

As stated above, Fig. 2 of the drawings shows the control mechanism of the automatic transmission 12 in low gear position. At this time the switch member 119 of the ignition switch 118 is in its closed position in engagement with the contact 121 for supplying energizing current to the ignition coil 120 and to the switch devices and circuits of the control mechanism. The closing of the switch member 119 for starting the engine causes current to be supplied from the battery 110 to the junction point 168, and thence through the conductor 169 and the normally closed switch 149 to the magnet 139 of the electromagnetic switch 106. The energization of the magnet 139 actuates the switch device 106 to the position shown in Fig. 2, in which the normally closed switches 140, 142, and 143 have been opened and the normally open switch 141 has been closed. This actuation of the switch device 106 prepares the energizing circuit of the magnetic clutch 13 such that this clutch can thereafter be energized in response to actuation of the accelerator 109.

Upon closing of the ignition switch 118, current is also supplied from the battery 110 to the contact 133 of the governor switch device 105 through the conductor 170. The closing of the switch 118 also causes current to be supplied from the battery 110 to contact 160a of the accelerator switch 160 through the resistor 171, conductor 172, neutral switch 126, and conductor 173.

The condition of the automatic transmission 12 is now with the gear unit 11 in its low gear setting and with the engine running at idling speed, but with both of the magnetic clutches 13 and 14 deenergized. As the operator depresses the accelerator 109, the accelerator switch 160 will be closed causing the magnetic clutch 13 to be energized simultaneously with the speeding up of the engine. The energization of the magnetic clutch 13 connects the shaft member 28 with the input shaft 16, thereby causing forward movement of the vehicle in low gear. As the speed of the vehicle increases, the governor 101 shifts the movable contact 133 into engagement with the contact 129 thereby completing a second energizing circuit for the magnet 139 through the conductor 174.

The energizing circuit for the magnetic clutch 13 at this time extends from the battery 110 through the resistor 171, the conductor 172, neutral switch 126, conductor 173, accelerator switch 160, resistor 175, conductor 176, switch 141, and conductor 177 to winding 20. The presence of the resistor 171 in this energizing circuit for the clutch 13 limits or controls the voltage of the current being supplied to this clutch, such that the clutch will be energized to a somewhat less extent than its maximum energization and the connection of the shaft member 28 with the input member 16 will be accomplished smoothly and without any sudden or jerking action for the starting of the forward movement of the vehicle. As the accelerator pedal 109 is further depressed to increase the speed of the vehicle in the low gear setting, the accelerator switch 161 is closed thereby short-circuiting the resistor 175 and increasing the energization of the magnetic clutch 13 such that slippage occurring in the connection between the shaft member 28 and the input member 16 will be decreased or eliminated.

The increase in the speed of the vehicle causes the flyball governor 101 to shift the movable contact 133 from the contact 129 to the intermediate contact 130, thereby supplying energizing current to the magnet 148 of the switch device 107 through the conductor 178. The energization of the magnet 148 causes opening of the switch 149 and closing of the switch 150. The movement of the contact 133 out of engagement with the contact 129 and the opening of the switch 149 causes the magnet 139 to be deenergized, thereby permitting the switches 140, 142, and 143 to close. This closing of the switch 140 causes the conductor 169 to short-circuit the voltage control resistor 171. So long as the switch 140 remains closed, the resistor 171 will be ineffective and the magnetic clutches 13 and 14 will be fully energized as the energizing circuits thereof are closed.

The opening of the switch 141 opens the energizing circuit for the magnetic clutch 13 and the closing of the switch 150 closes the energizing circuit for the magnetic clutch 14. The energization of the magnetic clutch 14 thereupon connects the hollow shaft member 31 with the input shaft 16 such that the output shaft 46 is then driven through the second gear ratio of the gear unit 11. The energizing circuit for the magnetic clutch 14 at this time extends from the accelerator switch 161 through conductors 176 and 179, through switch 150, conductor 180, switch 155 and conductor 181 to winding 21.

As the speed of the vehicle increases further, the flyball governor 101 shifts the movable contact 133 from the contact 130 to the contact 131. The engagement of the contact 133 with the contact 131 closes the energizing circuit for the magnet 167 of the solenoid valve 163, thereby opening the valve member 166 and connecting the power device 84 with the intake 89 through the suction tank 164. The resulting actuation of the power device 84 shifts the gearing of the unit 11 to its high gear setting in which the output shaft 46 is connected in direct drive relation with the shaft member 28.

This actuation of the power device 84 also actuates the switch device 108 to cause closing of the switch 154 and opening of the switch 155. Such opening of the switch 155 deenergizes the magnetic clutch 14 and such closing of the switch 154 energizes the magnetic clutch 13. The deenergization of the magnetic clutch 14 renders the drive through the hollow shaft member 31 ineffective and the energization of the magnetic clutch 13 re-establishes a driving connection between the input shaft 16 and the shaft member 28.

Before tracing the energizing circuit now effective for energizing the magnetic clutch 13, it should be explained that at the time the contact 133 is shifted from the contact 130 to the contact 131, the magnet 148 is being energized from the junction point 168 through the switch 142 and the conductor 182, as well as through the conductor 178, such that the magnet 148 remains energized after the contact 133 has disengaged the contact 130 and moved onto the contact 131. The energizing circuit for the magnetic clutch 13 at this time extends from the accelerator switch 161 through a portion of the conductor 176, through the conductor 179, the switch 152, a portion of the conductor 180, then through the conductor 183, through the switch 154 and the conductor 184 to winding 20.

During the operation of the vehicle in the high gear setting of the unit 11 and with the accelerator pedal 109 depressed, the automatic transmission will remain in this condition with the magnetic clutch 13 energized. If the accelerator is further depressed, however, such as for increasing the vehicle speed for passing another vehicle or for an increased power output for the purpose of climbing a hill, the accelerator switch 162 will be opened thereby deenergizing the magnet 167 of the solenoid valve 163 and permitting a spring 166a to cause closing of the valve 166. The closing of the valve 166 deenergizes the power device 84, whereupon the spring 92 shifts the setting of the gear unit 11 to a lower gear ratio, and also actuates the switch device 108.

This deenergization of the power device 84 causes the magnetic clutch 13 to be deenergized and the magnetic clutch 14 to be reenergized. The energization of the magnetic clutch 14 connects the shaft member 31 with the input shaft 16, thereby shifting the gear unit 11 to its second gear setting. When the abnormal condition no longer exists and the accelerator pedal is permitted to resume a normal high speed driving position, the accelerator switch 162 will be reclosed thereupon reenergizing the magnet 167 of the solenoid valve 163 and reconnecting the power device 84 with the intake 89. This results in the gear unit 11 being shifted back to its high gear setting and an actuation of the switch device 108 to deenergize the magnetic clutch 14 and again energize the magnetic clutch 13.

Figure 3:
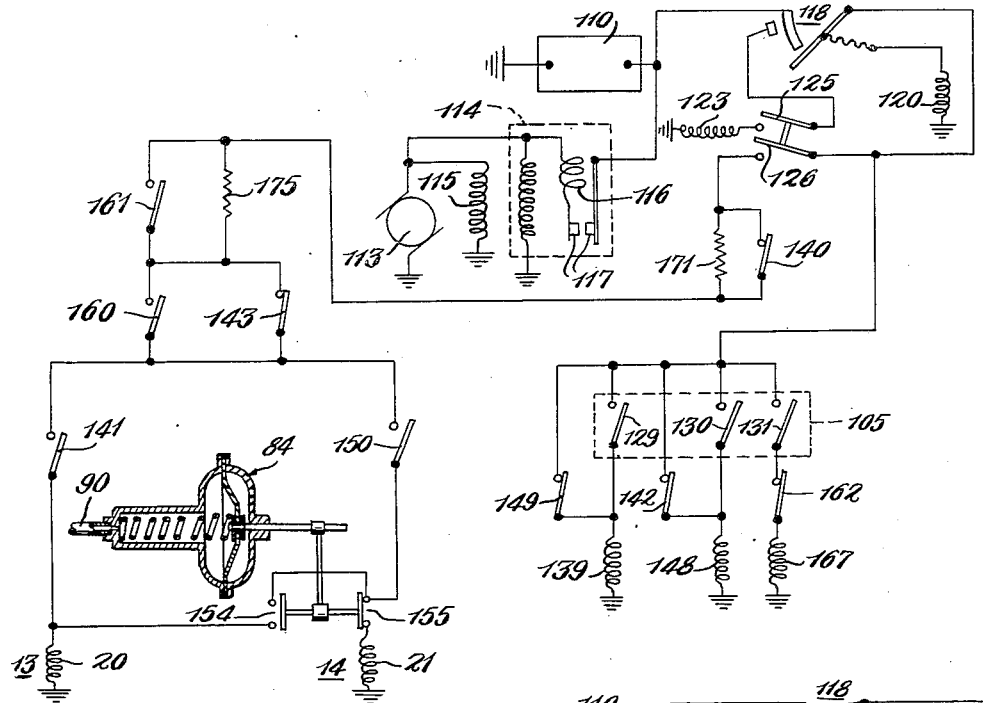
Figs. 3 to 6 inclusive are schematic wiring diagrams showing the control circuits for the different gear ratios and operating conditions of the automatic transmission.

Figs. 3 to 6 inclusive of the drawings are schematic wiring diagrams further illustrating the above-described circuits of the control mechanism and representative of the different conditions of operation and of the different gear ratio settings. Fig. 3 illustrates the circuit connections prior to the closing of the starting and ignition switch 118, or in other words, the condition of the circuits when the engine is stopped. At this time the battery 110 is disconnected from the generator 13 by the open condition of the series contacts 117 of the reverse current cut-out 114.

Figure 4:
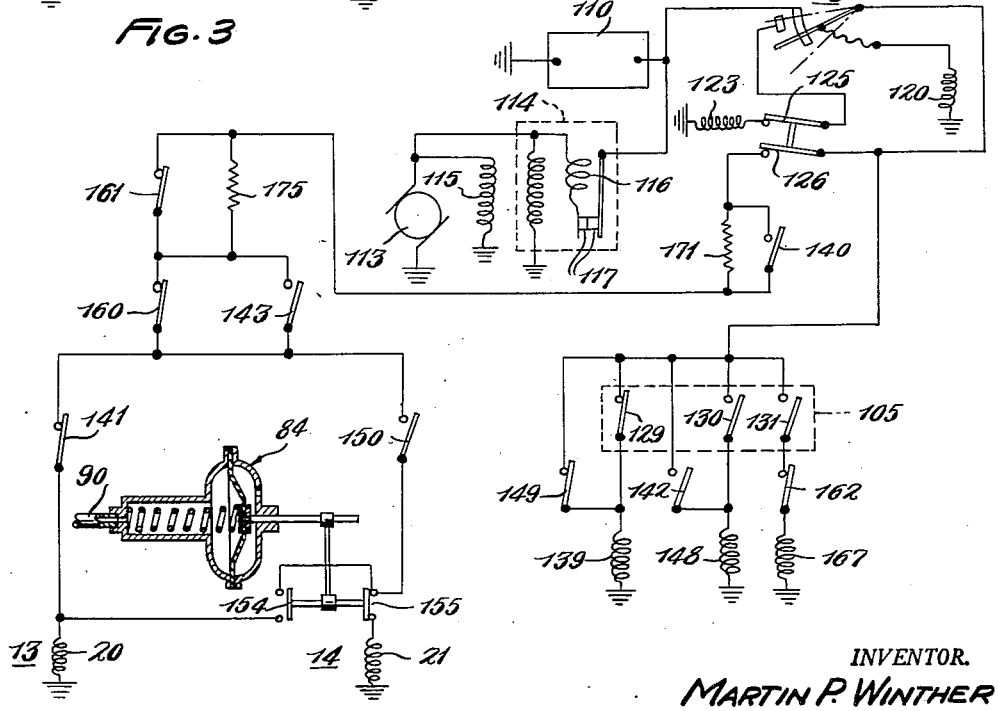
Figure 5:
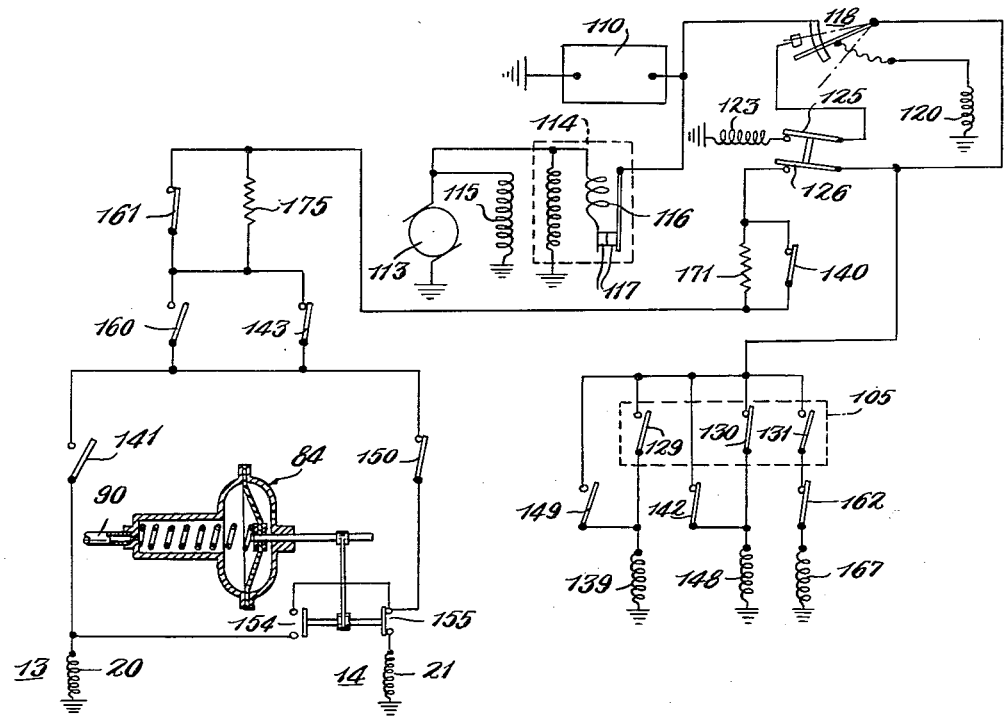
Figure 6:
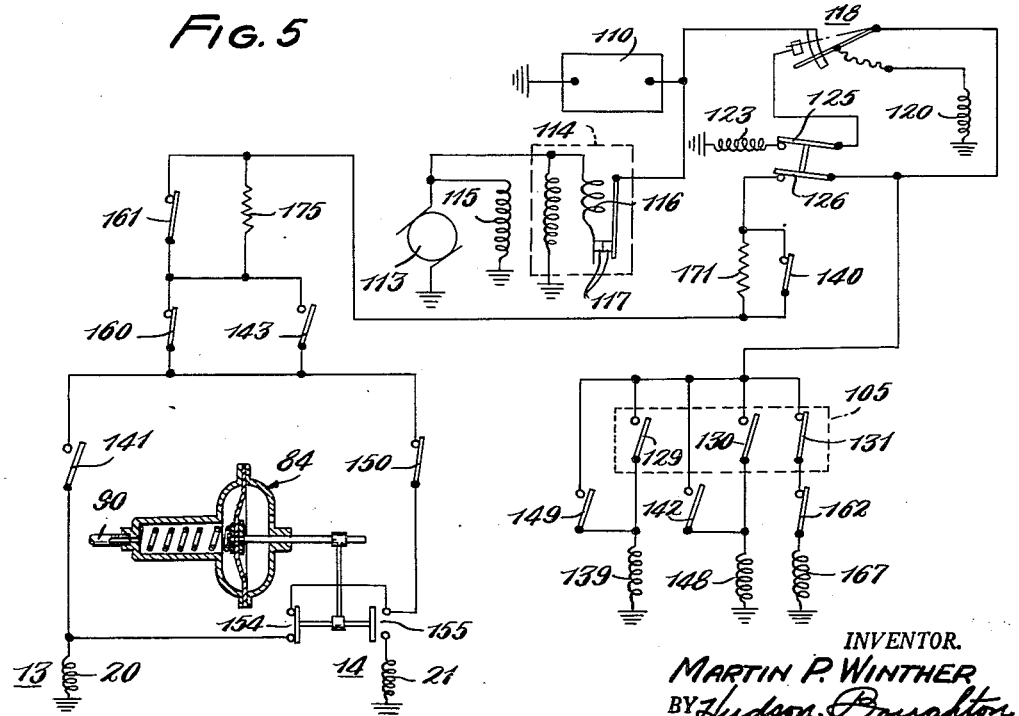

Fig. 4 shows the condition of the control circuits for the low gear setting and operation of the transmission. Fig. 5 shows the condition of the circuits for the second gear setting, and Fig. 6 illustrates the condition of the circuits for the high gear setting.

Since the various energizing circuits have already been traced above and are readily apparent from the wiring diagrams of Figs. 3 to 6 inclusive, it is not necessary to describe these circuits in detail in connection with the latter views.

From the accompanying drawings and the foregoing detailed description, it will now be readily understood that the automatic transmission 12 is of a relatively simple and practical construction and will perform smoothly and satisfactorily under all conditions of vehicle operation. Since many of the advantages of this automatic transmission have already been described or referred to above, they need not be here repeated.

Although the automatic transmission of this invention has been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In an automatic transmission for a motor vehicle, a rotatable input member, a rotatable output shaft having gear means thereon, a pair of rotatable shaft members having gear members connected therewith, variable ratio gear mechanism connecting said gear means with said gear members and including shift means operable to vary the transmission ratio setting of said gear mechanism, a pair of magnetic clutches for selectively connecting said shaft members with said input member, and control means responsive to vehicle speed for controlling the actuation of said shift means and the energization of said magnetic clutches.

2. In an automatic transmission for a vehicle having an intake throttle controlling driving motor; a rotatable input member adapted to be driven by said motor; a rotatable output shaft; a pair of rotatable shaft members; variable ratio gear mechanism connecting said output with said shaft members and including shift means operable to vary the transmission ratio of said gear mechanism; a pair of magnetic clutches for selectively connecting said shaft members with said input member; and control means controlling the actuation of said shift means and the energization of said magnetic clutches, said control means comprising a differential pressure device responsive to changes in intake suction, a speed responsive means responsive to vehicle speed and a throttle position responsive means.

3. In an automatic transmission for use with a vehicle engine having an accelerator, a rotatable input member, a pair of rotatable shaft members, a rotatable output shaft, a gear train, shiftable connecting means effective in one position thereof for establishing a substantially direct connection between said output shaft and one of said shaft members and effective in another position for establishing a connection between said output shaft and one of said shaft members through said gear train, a differential pressure device operable to shift said connecting means, a pair of magnetic clutches for selectively connecting said shaft members with said input member, accelerator responsive control means controlling said differential pressure device, and means controlling the energization of said magnetic clutches comprising switch means actuated by said differential pressure device and speed responsive switch means responsive to the rotation speed of said output shaft.

4. In an automatic transmission for use with an accelerator controlled engine, a rotatable input member, a pair of rotatable shaft members, a rotatable output shaft, a pair of magnetic clutches for selectively connecting said shaft members with said input member, a gear train having an output portion and also having a pair of relatively rotatable input portions connected with the respective shaft members of said pair and providing different transmission ratios, shiftable connecting means effective in one position thereof for establishing a substantially direct connection between said output shaft and one of said shaft members and effective in another position for connecting said output shaft with said output portion of the gear train, one-way clutch means automatically operable between said input portions for rendering one or the other of said transmission ratios effective depending upon which of said magnetic clutches is energized, power means for shifting said shiftable connecting means, accelerator responsive control means controlling said power means, and means controlling the energization of said magnetic clutches comprising switch means actuated by said power means and speed responsive switch means responsive to the rotation speed of said output shaft.

5. In an automatic transmission, a rotatable input member, a pair of rotatable shaft members, a rotatable output shaft, a pair of magnetic clutches for selectively connecting said shaft members with said input member, a gear train having an output portion connected with said output shaft and having a pair of relatively rotatable input portions connected with the respective shaft members of said pair and providing different transmission ratios one or the other of which is effective depending upon which of said magnetic clutches is energized, a first energizing circuit for one of said magnetic clutches, a second energizing circuit for the other of said magnetic clutches, a first electro-magnetic switch having control contact means in one of said circuits, a second electromagnetic switch having control contact means in the other of said circuits, and speed responsive switch means controlling the energization of said first and second electromagnetic switches.

6. In an automatic transmission; a rotatable input member; a pair of rotatable shaft members; a rotatable output shaft; a pair of magnetic clutches for selectively connecting said shaft members with said input member; a gear train having an output portion connected with said output shaft and having a pair of relatively rotatable input portions connected with the respective shaft members of said pair and providing different transmission ratios one or the other of which is effective depending upon which of said magnetic clutches is energized; a first energizing circuit for one of said magnetic clutches; a second energizing circuit for the other of said magnetic clutches; a first electromagnetic switch having control contact means in one of said circuits; a second electromagnetic switch having control contact means in the other of said circuits; an electromagnet-controlled power device, including other switch means located in said first and second circuits and adapted to be actuated by operation of said power device; and speed responsive switch means controlling the energization of said first and second electromagnetic switches and the operation of said power device.

7. In an automatic transmission for a motor vehicle having an accelerator; a rotatable input member; a pair of rotatable shaft members; a rotatable output shaft; a pair of magnetic clutches for selectively connecting said shaft members with said input member; a gear train having an output portion connected with said output shaft and having a pair of relatively rotatable input portions connected with the respective shaft members of said pair and providing different transmission ratios one or the other of which is effective depending upon which of said magnetic clutches is energized; a first energizing circuit for one of said magnetic clutches; a second energizing circuit for the other of said magnetic clutches; a first electromagnetic switch having control contact means in one of said circuits; a second electromagnetic switch having control contact means in the other of said circuits; an electromagnet-controlled power device, including other switch means located in said first and second circuits and adapted to be actuated by operation of said power device; speed responsive switch means controlling the energization of said first and second electromagnetic switches and the operation of said power device; and accelerator actuated switch means also controlling said first and second circuits and the operation of said power device.

8. In an automatic transmission, a rotatable input member, a pair of rotatable shaft members, a rotatable output shaft, a pair of magnetic clutches for selectively connecting said shaft members with said input member, gear mechanism for connecting said output shaft with said shaft members and providing two transmission ratios one or the other of which is effective depending upon which of said magnetic clutches is energized, energizing circuit means for said magnetic clutches including a voltage control resistor, electromagnetic switch means having switch contacts in said circuit means for causing selective energization of said clutches with said resistor in series circuit with at least one of said clutches, said electromagnetic switch means also having switch contacts operable to short-circuit said resistor, and speed responsive switch means controlling the operation of said electromagnetic switch means.

9. In an automatic transmission for a vehicle having an accelerator, a rotatable input member, a rotatable output shaft, a pair of rotatable shaft members, a pair of magnetic clutches for selectively connecting said shaft members with said input member, gear mechanism connecting said output shaft with said shaft members and providing a plurality of different transmission ratios one or another of which is effective depending upon which of said magnetic clutches is energized, speed responsive switch means controlling the energization of said magnetic clutches, and accelerator movement responsive means for advancing the actuation of said speed responsive switch means.

10. In an automatic transmission for a vehicle having a driving motor provided with an accelerator controlled intake, a rotatable input member driven by said motor, a rotatable output shaft, a pair of rotatable shaft members, variable ratio gear mechanism connecting said output shaft with said shaft members and including shift means operable to vary the transmission ratio of said gear mechanism, a pair of magnetic clutches for selectively connecting said shaft members with said input member, switch means controlling the energization of said magnetic clutches, and a differential pressure device responsive to changes in intake suction and operable to actuate said shift means and said switch means.

11. In an automatic transmission for a vehicle having a driving motor provided with an accelerator controlled intake, a rotatable input member driven by said motor, a rotatable output shaft, a pair of rotatable shaft members, variable ratio gear mechanism connecting said output shaft with said shaft members and including shift means operable to vary the transmission ratio of said gear mechanism, a pair of magnetic clutches for selectively connecting said shaft members with said input member, switch means controlling the energization of said magnetic clutches, a differential pressure device responsive to changes in intake suction and operable to actuate said shift means and said switch means, and accelerator actuated means for controlling the operation of said differential pressure device.

12. In a transmission of the character described, a rotatable input shaft, an output shaft, a pair of coaxial driven shaft members disposed between and in substantial alignment with said input shaft and said output shaft, a pair of clutch devices selectively operable to connect one or the other of said shaft members with said input shaft to be driven thereby, first and second gears connected with said driven shaft members, a third gear rotatable on said output shaft and spaced from said second gear, countershaft means having a pair of gears thereon meshed with said first and second gears and providing different transmission ratios with one gear of said pair being fixed on said countershaft means, one-way clutch means automatically operable to drivingly connect the other gear of said pair with said countershaft means, said countershaft means being effective to transmit torque to said third gear from one or the other of said first and second gears depending upon which of said first and second gears is connected with said input shaft by the selective operation of one of said clutches, coupling means between said second and third gears and selectively operable to an engaged condition for connecting said output shaft to be driven by one or the other of said second or third gears, spring means tending to produce disengagement of said coupling means, and actuating means adapted to overcome said spring means and to actuate said coupling means to said engaged condition.

13. A transmission as defined in claim 12 in which said clutch devices are electromagnetic clutches.

14. In an automatic transmission, a rotatable input member, a pair of rotatable shaft members, a rotatable output shaft, a pair of magnetic clutches for selectively connecting said shaft members with said input member, a gear train having an output portion connected with said output shaft and having a pair of relatively rotatable input portions connected with the respective shaft members of said pair and providing different transmission ratios, one-way clutch means automatically operable between said input portions for rendering one or the other of said transmission ratios effective depending upon which of said magnetic clutches is energized, and control means selectively controlling the energization of said magnetic clutches, said control means comprising speed responsive means responsive to the speed of rotation of said output shaft.

15. In an automatic transmission, a rotatable input member, a pair of rotatable shaft members, a rotatable output shaft, a pair of magnetic clutches for selectively connecting said shaft members with said input members, a gear train having an output portion connected with said output shaft and having a pair of relatively rotatable input portions connected with the respective shaft members of said pair and providing different transmission ratios, one-way clutch means automatically operable between said input portions for rendering one or the other of said transmission ratios effective depending upon which of said magnetic clutches is energized, and control means selectively controlling the energization of said magnetic clutches, said clutch means comprising an overrunning clutch and said control means comprising speed responsive means responsive to the speed of rotation of said output shaft.

References Cited in the file of this patent

UNITED STATES PATENTS

| | | |
|---|---|---|
| 2,376,545 | Livermore | May 22, 1945 |
| 2,386,217 | Kegresse | Oct. 9, 1945 |
| 2,567,042 | Wemp | Sept. 4, 1951 |
| 2,582,220 | Beckwith | Jan. 15, 1952 |
| 2,605,650 | Winther et al. | Aug. 5, 1952 |
| 2,615,349 | Winther | Oct. 28, 1952 |

FOREIGN PATENTS

| | | |
|---|---|---|
| 681,010 | Great Britain | Oct. 15, 1952 |
| 951,410 | France | Apr. 18, 1949 |